United States Patent Office 3,310,679
Patented Mar. 21, 1967

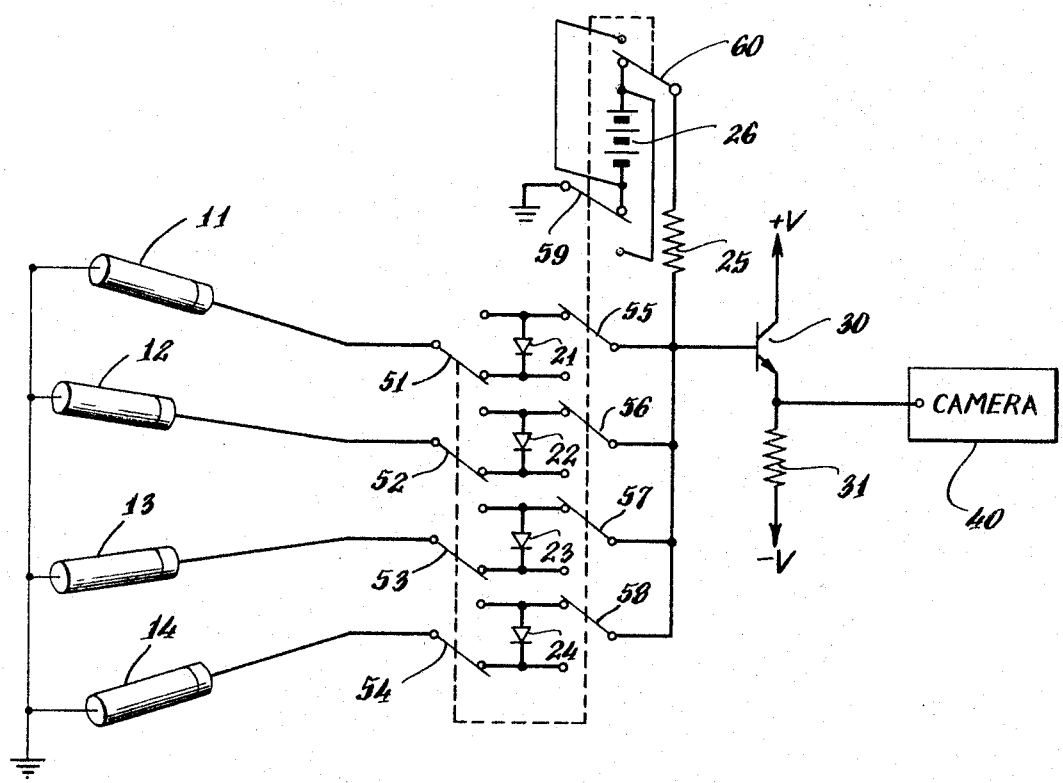
INVENTOR.
*Richard C. Babish*
BY
*Andrew L. Vey*
ATTORNEY.

3,310,679
MAXIMUM OR MINIMUM BRIGHTNESS RESPONSIVE EXPOSURE CONTROL CIRCUIT
Richard C. Babish, Wilton, Conn., assignor to The Perkin-Elmer Corporation, Norwalk, Conn., a corporation of New York
Filed Mar. 27, 1964, Ser. No. 355,399
4 Claims. (Cl. 250—209)

General

The present invention relates to an exposure control system wherein the maximum or minimum brightness of a field of view is sensed so that the camera exposure mechanism may be set according to this maximum or minimum brightness.

In general, exposure meters and exposure control systems which are presently available are based upon providing an indication of the average brightness of a field of view. In some cases these exposure devices utilize a single photocell for the entire field of view. The electrical signal developed by this photocell is representative of the average brightness of the field of view. In other cases a plurality of photocells may be used, but the electrical signals developed by the photocells are so processed as to again develop an indication of the average brightness of the field of view.

A limitation of such exposure setting devices is that if the particular object of interest is in an area which is brighter than the average brightness, the object is overexposed and if this object is in an area which is less bright than the average brightness, the object is underexposed. In many applications, the only object of interest may be in a higher brightness portion or a lower brightness portion of the field of view. In such cases it becomes necessary to physically position the exposure setting device in the immediate vicinity of the object. This is sometimes impossible to do.

It is an object of the present invention to provide a new and improved exposure control system.

It is another object of the present invention to provide an exposure control system capable of sensing the maximum or minimum brightness in a field of view.

An exposure control system constructed in accordance with the present invention comprises means for viewing a field of view and for developing electrical signals representative of the brightness of different portions of the field of view and means for selecting that electrical signal representative of that portion of the field of view having an extreme value of brightness.

For a better understanding of the present invention together with other and further objects thereof, reference is had to the following description, taken in connection with the accompanying drawing, and its scope will be pointed out in the appended claims.

Referring to the drawing, there is shown one embodiment of an exposure control system constructed in accordance with the present invention.

Description and operation of exposure control system

Referring to the drawing, an exposure control system constructed in accordance with the present invention includes means for viewing a field of view and for developing electrical signals representative of the brightness of different portions of the field of view. This function may be performed by a plurality of photocells 11, 12, 13 and 14 which are pointed in various directions so as to individually view the different portions of a field of view of interest. Each of the photocells develops an electrical signal having an amplitude which varies directly with the brightness of that portion of the field of view toward which it is pointed.

The exposure control system of the invention further includes means for selecting that electrical signal representative of that portion of the field of view having an extreme value of brightness. The drawing shows the invention arranged to sense the minimum brightness of the field of view. Therefore, for this arrangement, that signal having the smallest magnitude is selected. A plurality of diodes, 21, 22, 23 and 24, a resistor 25 and a voltage source 26 serve to select the smallest signal. As is shown in the drawing, each of the diodes 21–24, inclusive, has its cathode connected to the photocells 11–14, inclusive, respectively. The voltage source 26 is coupled to the anodes of the diodes 21–24, inclusive, through resistor 25.

The diode circuitry in the drawing is so arranged as to receive positive signals from the photocells. Assuming that each of the signals developed by the photocells is smaller in magnitude than the magnitude of the voltage source 26, one of the diodes 21–24, inclusive, must be rendered conductive. As soon as this diode becomes conductive the junction of the anodes of the four diodes is brought to the same potential that exists at the cathode of that diode which has been rendered conductive. The diode which is rendered conductive must be that diode to which the smallest magnitude signal is supplied. Thus, the junction of the anodes of the four diodes assumes the same potential as the magnitude of the smallest signal developed by the four photocells. This neglects to take into consideration the voltage drop developed across that diode which is rendered conductive. Once the junction of the four anodes assumes this particular potential, the remaining diodes necessarily remain nonconductive since the cathodes of these diodes are supplied with signals which are greater in magnitude and, therefore, more positive than the potential of the junction of the anodes.

After the smallest magnitude signal is selected it is passed to an amplifier which, for the embodiment shown in the drawing, includes a transistor 30, an emitter resistor 31, and a pair of voltage sources +V and −V. The output from the amplifier is, in turn, passed to the camera 40 which is to have its exposure mechanism controlled in accordance with the minimum brightness which is detected. This control may be effected by a moving coil or equivalent device capable of controlling the iris or shutter of the camera. The apparatus may be properly calibrated either in the exposure control system or the camera itself.

In order to sense the maximum brightness of the field of view and to control camera 40 accordingly, the arrangement shown in the drawing is modified by reversing the polarity of the diodes 21–24, inclusive, and reversing the polarity of voltage source 26. This may be accomplished by a plurality of switches 51–60, inclusive, which are mechanically ganged together. when the switches 51–60, inclusive, switch to the other positions shown in the drawing, the anodes of the diodes 21–24, inclusive, are individually connected to the photocells 11–14, inclusive, and a negative voltage from source 26 is coupled to the junction of the four cathodes of the diodes through resistor 25. It will be seen that the junction of the cathodes assumes approximately the same potential as the magnitude of the largest signal developed by the photocells. This corresponds to maximum brightness.

While there has been described what is at present considered to be a preferred embodiment of the present invention, it will be obvious to those skilled in the art that various changes and modifications may be made therein without departing from the invention and it is, therefore, aimed to cover all such changes and modifications as fall within the true spirit and scope of the invention.

What is claimed is:

1. Apparatus for use with an electrically operated camera exposure control mechanism comprising:
    a plurality of photocells for individually viewing different portions of a viewing area and developing electrical signals representative of the intensity of light at said different portions, and
    polarity sensitive means for automatically selecting that electrical signal representative of the portions of the viewing area having an extreme value of light intensity and means for reversing the polarity of said polarity sensitive means.

2. The invention according to claim 1 and wherein said polarity sensitive means includes a plurality of diodes and a voltage source, the voltage source being connected to each of the diodes, and each of said diodes being connected to a different one of said photocells.

3. The invention according to claim 2 wherein said reversing means includes a plurality of switches connected to said voltage source and said diodes for reversing the polarity of said voltage source and said diodes.

4. This invention according to claim 3 and wherein the polarity of the voltage from the voltage source to the diodes is positive and wherein each of said diodes has its cathode connected to said photocells, whereby the electrical signal having the smallest magnitude will be selected.

References Cited by the Examiner
UNITED STATES PATENTS

| | | | |
|---|---|---|---|
| 2,951,970 | 9/1960 | Matarese | 250—213 |
| 2,953,984 | 9/1960 | Hostetter | 95—10 X |
| 3,212,394 | 10/1965 | Norwood | 250—209 X |

WALTER STOLWEIN, *Primary Examiner.*